Patented May 19, 1931

1,806,285

UNITED STATES PATENT OFFICE

OTTO ERNST AND HEINRICH LANGE, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PREPARING CHLORACETALDEHYDE

No Drawing. Application filed October 9, 1928, Serial No. 311,412, and in Germany October 22, 1927.

The present invention relates to a new process of preparing chloracetaldehyde.

According to the oldest method of preparing chloracetaldehyde, hypochlorous acid is caused to act upon vinyl chloride in the presence of mercuric oxide in an aqueous solution. The yields obtained by this method varied and were insufficient. This process was not suitable for the preparation of greater quantities in spite of the fact that the test conditions were frequently modified so that more recent authors preferred the preparation of the chloracetaldehyde from dichlorether and from monochloracet-acetal obtainable therefrom respectively.

Now we have made the surprising observation that the formation of chloracetaldehyde from vinyl chloride is realized with a good yield without the application of a catalyst by introducing chlorine gas and vinyl chloride into water, the temperature being advantageously kept between 0° C. and 40° C., whereby the formation of by-products may be avoided and the concentration of chloracetaldehyde increased. In contrast with the known processes, our new process does not require first the preparation of the hypochlorous acid by a special operation in order to combine it with the vinyl chloride in the presence of a catalyst, but the hypochlorous acid is simply caused to act upon the vinyl chloride in the moment of its nascence, without using a catalyst. When the reaction is carried out at a moderately elevated temperature i. e. between 40° C. and about 80° C. it must be interrupted at an earlier stage in order that the formation of by-products, especially the oxidation of the so formed chloracetaldehyde to chloroacetic acid by means of the hypochlorous acid may be avoided. It is advantageous to exclude light as it favors the formation of 1.1.2-trichlorethane having the formula

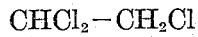

$$CHCl_2 - CH_2Cl$$

The reaction of the gases is so complete, that by employing adequate, that is to say, molecular proportions, the gases completely disappear. In order to obtain a more perfect mixture and to avoid that the solution is more highly concentrated on the bottom of the reaction vessel, it has proved to be advantageous to mix one of the introduced gases with an inert gas such as nitrogen or carbonic acid, as the bubbles rising and which do not disappear are continuously and thoroughly mixing the liquor. It is also advantageous for the course of the reaction to employ a small excess of vinyl chloride. After the reaction is complete the chloracetaldehyde is isolated by fractional distillation. On account of its containing two reactive constituents, namely the aldehyde group and the chlorine atom, chloracetaldehyde is a starting material greatly demanded for numerous synthetic processes.

The following examples illustrate our invention, but they are not intended to limit it thereto:

1. Into 2 liters of water are introduced within 4 hours, simultaneously but through separate conducting pipes, 32 liters each of chlorine and vinyl chloride. The apparatus, a high cylinder, preferably filled with "Raschig" rings or similar dispersing agents, is protected by some covering against the penetration of light, the temperature being 35° C. The gases are completely consumed. After the expiration of the 4 hours, the solution contains 75% of the theory (relatively to the quantity of vinyl chloride introduced) of chloracetaldehyde besides trichlorethane and chloroacetic acid. The chloracetaldehyde is isolated by fractional distillation.

2. The procedure is the same as that indicated in Example 1, except that the mass is cooled with ice water and twice the quantity of gas is introduced. After expiration of the reaction time, the solution contains 72% of the vinyl chloride introduced in form of chloracetaldehyde. The chloracetaldehyde is isolated by fractional distillation.

3. The procedure is the same as that indicated in Example 1, except that the mass is cooled with ice water and an inert gas is added. The yield of chloracetaldehyde amounts to 70% of the theory. The chloracetaldehyde is isolated by fractional distillation.

We claim:

1. In the process of preparing chloracetaldehyde, the step which consists in introducing into water chlorine gas and vaporous vinyl chloride.

2. In the process of preparing chloracetaldehyde, the step which consists in introducing into water while thoroughly mixing, chlorine gas and vaporous vinyl chloride at a temperature between 0° C. and 40° C.

3. In the process of preparing chloracetaldehyde, the step which consists in introducing into water chlorine gas and vaporous vinyl chloride at a temperature between 0° C. and 40° C. while simultaneously introducing an inert gas in order to obtain a thorough mixture.

4. In the process of preparing chloracetaldehyde, the step which consists in introducing into water molecular quantities of chlorine gas and vaporous vinyl chloride, at a temperature between 0° C. and 40° C. while simultaneously introducing an inert gas in order to obtain a thorough mixture.

5. In the process of preparing chloracetaldehyde the step which consists in introducing into water molecular quantities of chlorine gas and vaporous vinyl chloride at a temperature between 0° C. and 40° C. while simultaneously applying a small excess of vinyl chloride and introducing an inert gas in order to obtain a thorough mixture.

6. In the process of preparing chloracetaldehyde, the step which consists in introducing into water in the dark molecular quantities of chlorine gas and vaporous vinyl chloride at a temperature of 35° C. while simultaneously applying a small excess of vinyl chloride and introducing carbonic acid.

In testimony whereof we have hereunto set our hands.

OTTO ERNST.
HEINRICH LANGE.